United States Patent [19]

Horimai

[11] Patent Number: 5,557,600
[45] Date of Patent: Sep. 17, 1996

[54] OPTICAL RECORDING MEDIUM WITH TRAYS LOCATED SO THAT MULTIPLE TRACKS CAN BE SCANNED SIMULTANEOUSLY

[75] Inventor: Hideyoshi Horimai, Kanagawa, Japan

[73] Assignee: Sony Corporation, Tokyo, Japan

[21] Appl. No.: 306,651

[22] Filed: Sep. 15, 1994

Related U.S. Application Data

[62] Division of Ser. No. 75,828, Jun. 11, 1993, Pat. No. 5,416,766.

[30] Foreign Application Priority Data

Jun. 15, 1992 [JP] Japan .................. 4-178887

[51] Int. Cl.$^6$ .................. G11B 7/007
[52] U.S. Cl. .................. 369/116; 369/275.1; 369/275.3; 369/124; 369/107
[58] Field of Search .................. 369/32, 44.26, 369/44.28, 44.34, 275.3, 44.41, 44.11, 116, 275.1, 124, 107

[56] References Cited

U.S. PATENT DOCUMENTS

| | | | |
|---|---|---|---|
| 5,018,123 | 5/1991 | Hosoya et al. | 369/44.11 |
| 5,193,081 | 3/1993 | Osawa et al. | 369/44.26 |
| 5,214,629 | 5/1993 | Watanabe | 369/44.26 |
| 5,255,263 | 10/1993 | Van Uijen et al. | 369/275.3 |
| 5,347,504 | 9/1994 | Ito et al. | 369/44.41 |
| 5,416,766 | 5/1995 | Horimai | 369/116 |

FOREIGN PATENT DOCUMENTS

| | | | |
|---|---|---|---|
| 0111006A1 | 6/1984 | European Pat. Off. | G11B 7/08 |
| 0376673A3 | 7/1990 | European Pat. Off. | G11B 7/00 |
| 0376626A3 | 7/1990 | European Pat. Off. | G11B 7/007 |
| 0463728A3 | 1/1992 | European Pat. Off. | G11B 7/14 |
| 0502582A1 | 9/1992 | European Pat. Off. | G11B 7/007 |

OTHER PUBLICATIONS

Patent Abstracts of Japan, vol. 13, No. 387 (P-924), 28 Aug. 1989 & JP-A-01 134 728 (NEC Corp.).
Patent Abstracts of Japan, vol. 9, No. 76 (P-346), 5 Apr. 1985 & JP-A-59 207 433 (Sony KK).

*Primary Examiner*—Georgia Y. Epps
*Assistant Examiner*—Kim-Kwok Chu
*Attorney, Agent, or Firm*—Limbach & Limbach L.L.P.

[57] ABSTRACT

An apparatus for playback of an optical recording medium where data are recorded after combined calculation of a difference signal and a sum signal generated by detecting reference patterns and the return light reflected from the optical recording medium. The recording medium has tracks formed at such a pitch that at least two tracks are scanned simultaneously by a spot of a light beam irradiated onto the recording surface. Each track has data composed of wobble pits formed at positions deviated from the track center and a multiplicity of pits formed exactly on the track center, wherein the multiple pits and the wobble pits are disposed successively. The apparatus comprises an optical detector and a signal discriminator. The optical detector has first and second adjacent light receiving areas divided along the tangential direction of the tracks and serving to receive the return light reflected from the optical recording medium. The signal discriminator comprises a subtracter for calculating the difference between the output detection signals of the first and second light receiving areas, and an adder for calculating the sum of such output detection signals. The signal discriminator discriminates the recorded data of the optical recording medium in accordance with the result of the combined calculation of the difference signal and the sum signal obtained respectively from the subtracter and the adder.

4 Claims, 14 Drawing Sheets

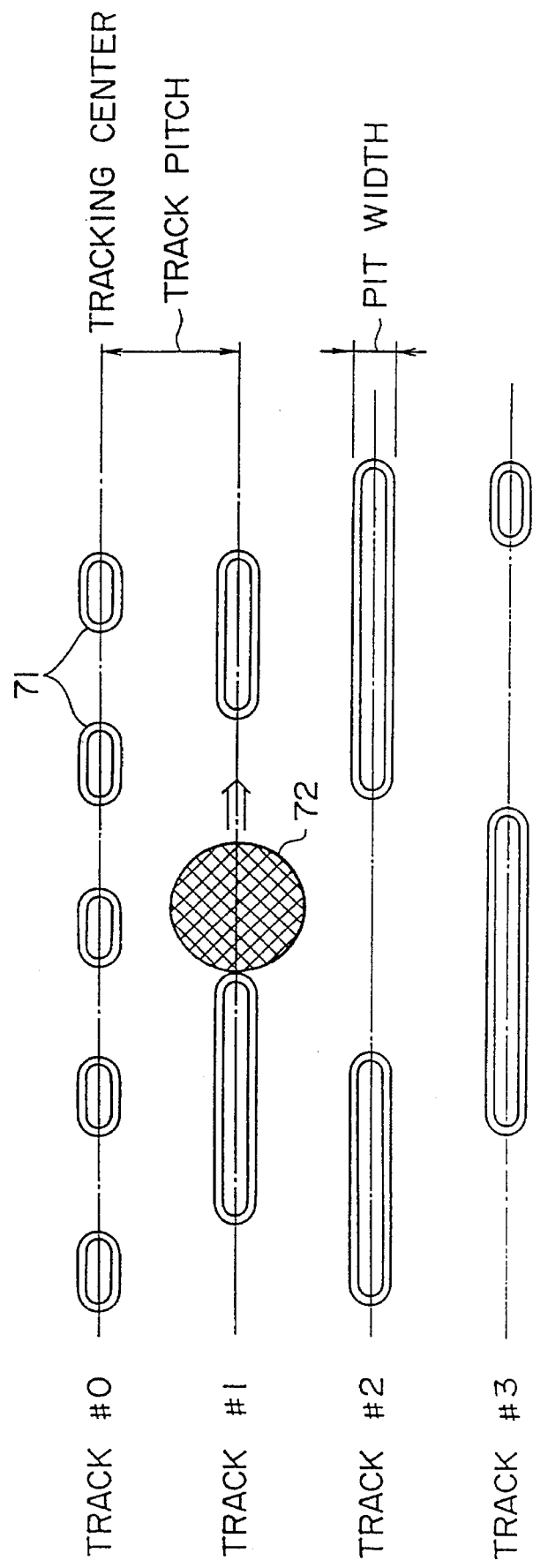

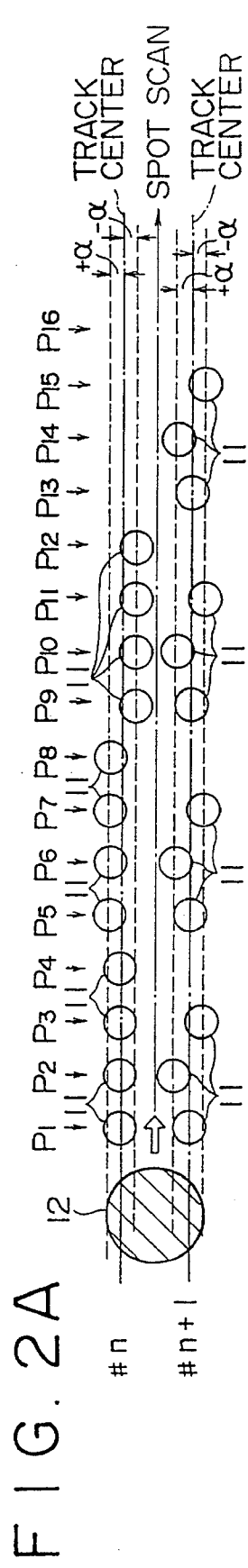
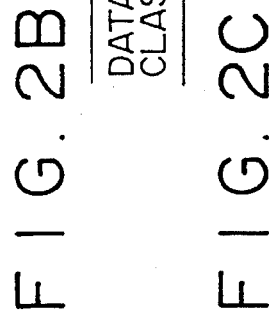
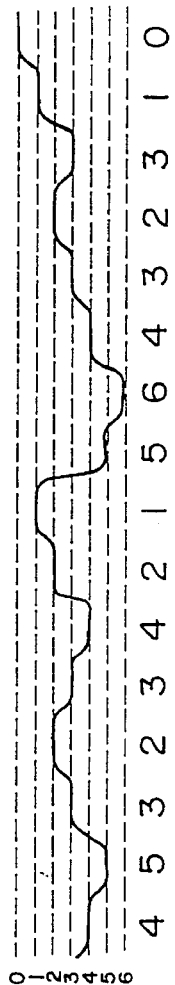
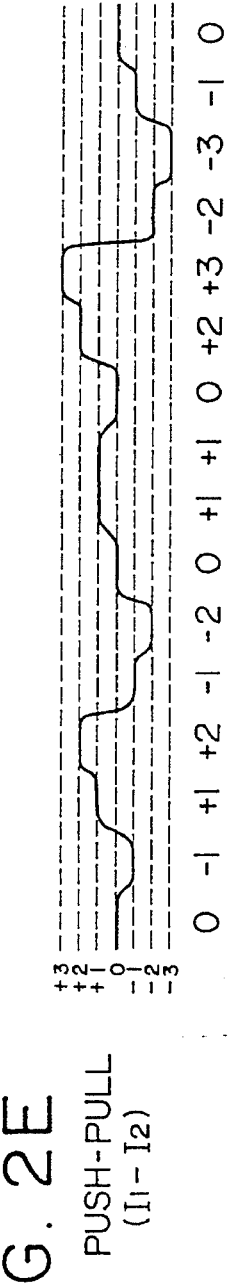

| TRACK #1 | A | M | B | M | A | M | C | M | B | M | C |
|---|---|---|---|---|---|---|---|---|---|---|---|
| TRACK #2 | B | M | B | M | M | B | M | M | C | A | M |
| TRACK #3 | A | M | A | C | B | M | M | M | C | C | M |
| TRACK #4 | C | B | A | A | A | M | B | C | M | B | M |

| R1 | P2 | P16 | P6 | P16 | P4 | P14 | P12 | P16 | P7 | P13 | P12 |
| --- | --- | --- | --- | --- | --- | --- | --- | --- | --- | --- | --- |
| R2 | P5 | P16 | P5 | P15 | P14 | P8 | P16 | P16 | P11 | P3 | P16 |
| R3 | P3 | P14 | P1 | P9 | P5 | P16 | P14 | P15 | P12 | P10 | P16 |

OPTICAL RECORDING MEDIUM WITH TRAYS LOCATED SO THAT MULTIPLE TRACKS CAN BE SCANNED SIMULTANEOUSLY

This is a divisional of application Ser. No. 08/075,828, filed Jun. 11, 1993, now U.S. Pat. No. 5,416,766, issued on May 16, 1995.

BACKGROUND OF THE INVENTION

1. Field of the Invention

The present invention relates to an optical recording medium such as an optical disc, magneto-optical disc, information card or the like where data are recorded with pits formed in tracks on its recording surface, and also to a method for playback of such a recording medium.

2. Description of the Related Art

A pit format on an optical recording medium such as an optical disc rotated at a predetermined constant angular velocity (CAV) is so formed as shown in FIG. 1 for example. In this exemplary pit format, pits 71 each having a width of 0.5 μm and a length of 0.86 μm are formed on tracks arrayed at a pitch of 1.6 μm in the radial direction. Such dimensions are set on the basis of restrictions in manufacture, the size of a playback beam spot 72 on the recording surface of an optical recording medium and so forth.

In this specification, the term "pit" signifies any of physically shaped pits such as an embossed one on a read-only optical disc, a bubble-like one on a write-only optical disc, or any of those represented by changes of the reflectivity on a phase-change type optical disc, or a pit optically detectable by utilizing the Kerr effect as on a magneto-optical disc.

For raising the recording density on such recording medium, it is generally customary to adopt techniques of narrowing the track pitch or shortening the pit length while reducing the spot size of a light beam so as to prevent generation of crosstalk that may be caused by the pits on adjacent tracks.

However, since the spot size of the light beam is proportional to the wavelength of the beam and is in inverse proportion to the numerical aperture (NA) of an objective lens, it becomes necessary to develop a novel laser light source of a short wavelength and to employ an expensive large-diameter lens for increasing the NA. Practically, however, there exist some limits in realizing a higher recording density by such techniques, and difficulties are unavoidable in attaining a remarkably enhanced density.

For achieving a higher recording density, there may be contrived a means of narrowing the track pitch while maintaining the desired spot size and diminishing the pit width in a manner to prevent occurrence of any crosstalk. In such a case, however, other problems arise as a result of diminishing the pit width, including that the yield rate in manufacture is lowered and the conventional cutting apparatus cannot be used.

SUMMARY OF THE INVENTION

It is an object of the present invention to provide a novel optical recording medium with an enhanced recording density and a method for playing back such recording medium.

According to a first aspect of the present invention, there is provided an optical recording medium with tracks each comprising wobble pits formed at positions deviated from the track center and a multiplicity of pits formed exactly on the track center. The wobble pits and the pits formed on the track center are positioned successively on each track, and the pitch of the tracks is determined so that at least two tracks are scanned simultaneously by a spot of a light beam irradiated onto the surface of the recording medium. Signal-data are recorded on the tracks of the optical recording medium in such a manner that the data can be detected on the basis of a push-pull signal and a sum signal obtained when the light beam irradiated onto the recording surface scans a preceding track and a following track adjacent thereto.

According to another aspect of the present invention, there is provided a method for playback of an optical recording medium where tracks having a multiplicity of pits are formed at such a pitch that at least two tracks are scanned simultaneously by a spot of a light beam irradiated onto the recording surface.

This playback method comprises the procedure of first irradiating a light beam onto the recording surface in such a manner as to simultaneously scan a preceding track and a following adjacent track on the optical recording medium. Then the reflected light beam is received from the optical recording medium. Subsequently a difference signal is generated corresponding to the difference between detection signals obtained from first and second light receiving areas of an optical detector divided along the tangential direction of the tracks on the optical recording medium, and a sum signal is generated corresponding to the sum of the detection signals obtained from the first and second light receiving areas. The data is reproduced by combining and calculating the difference signal and the sum signal.

In the present invention, an improved optical recording medium with an enhanced recording density and a playback method thereof can be provided by the use of a novel technique.

BRIEF DESCRIPTION OF THE DRAWINGS

FIG. 1 is an explanatory diagram illustrating a conventional optical disc playback method;

FIGS. 2A to 2E are explanatory diagrams showing the recording medium of the present invention and a playback method thereof;

DESCRIPTION OF THE PREFERRED EMBODIMENTS

Hereinafter exemplary embodiments of the present invention will be described in detail with reference to the accompanying drawings.

Referring first to FIGS. 2 and 3, a description will be given with regard to a pit format on a read-only optical disc as an embodiment of an optical recording medium.

In FIG. 2A, there are typically shown embossed pits 11 and a beam spot 12 irradiated from a playback apparatus to the recording surface of an optical disc. On this optical disc, the track pitch is set with respect to the diameter of the beam spot 12 in such a manner that two mutually adjacent tracks #n and #n+1 are scanned simultaneously. The pits 11 formed on each track include nonwobble pits (A) positioned exactly on the track center, wobble pits (B) positioned with a deviation from the track center off $+\alpha$ (as shown), and wobble pits (C) positioned with a deviation from the track center of $-\alpha$ (as shown). Furthermore, mirror portions (M) without any of the pits 11 are formed to thereby represent 4 possible data values (i.e. 4-value data).

In the 4-value data consisting of A, B, C, M as shown in FIG. 2B, the data A1, B1, C1, M1 are existent on the track #n, and the data A2, B2, C2, M2 are existent on the track #n+1. Therefore 16 kinds of data expressions (patterns P1–P16), i.e. 16-value data comprising combinations of the data A1, B1, C1, M1 and the data A2, B2, C2, M2 can be obtained as the beam scans the tracks #n and the track #n+1 simultaneously.

The data to be recorded on the tracks of the optical disc are modulated to four values in accordance with the data classes (A, B, C, M) on the tracks, so that a total of 16-value data can be reproduced in the patterns P1–P16.

Figures 3A, 3B, 3C:
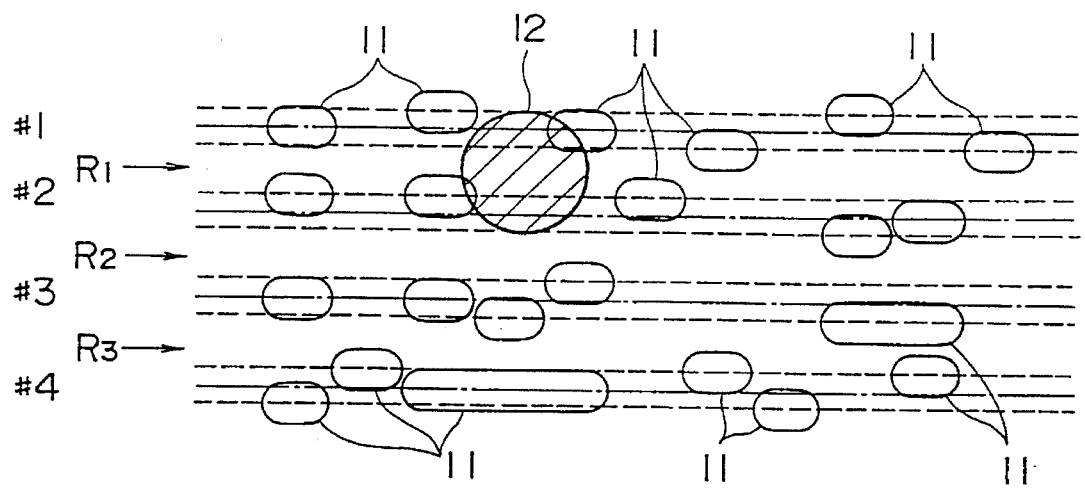
FIGS. 3A to 3C are explanatory diagrams showing how the recording medium of the invention is scanned for playback, and also the data reproduced therefrom.

For example, as shown in FIG. 3A, pits 11 are formed on the tracks #1, #2, #3, #4. In this example, each pit 11 has a width of 0.5 μm and a length of 0.86 μm. The track pitch is set to 0.8 μm which is substantially half the size or diameter (1.5 to 1.6 μm) of the scanning beam spot 12.

During the scan with the beam spot 12 in the playback mode, the beam spot 12 is controlled for tracking at the intermediate position between the mutually adjacent tracks. Then the data on the tracks #1 and #2 are read out by a scan R1, and similarly the data on the tracks #2 and #3 are read out by a scan R2, and subsequently the data on the tracks #3 and #4 are read out by a scan R3.

The data represented on the tracks #1–#4 are denoted by A, B, C, M as shown in FIG. 3B. FIG. 3C shows 16 values of the patterns P1–P16 extracted by the scans R1, R2, R3 as combinations of the data in FIG. 3A. For example, the data (A, B) obtained from the tracks #1, #2 by the scan R1 are reproduced as a pattern P2, and the data (M, M) are reproduced as a pattern P16. Consequently the storage capacity of this optical disc can be remarkably increased in comparison with that of the conventional optical disc where binary values "1" and "0" are expressed merely by the presence and absence of pits.

The record data consisting of A, B, C, M may be produced in such a manner that the data A, B, C, M correspond respectively to the record data "11", "10", "01", "00", or 4-bit data may be produced to correspond to a pair of mutually adjacent tracks (i.e., patterns P1–P16).

Figure 4:
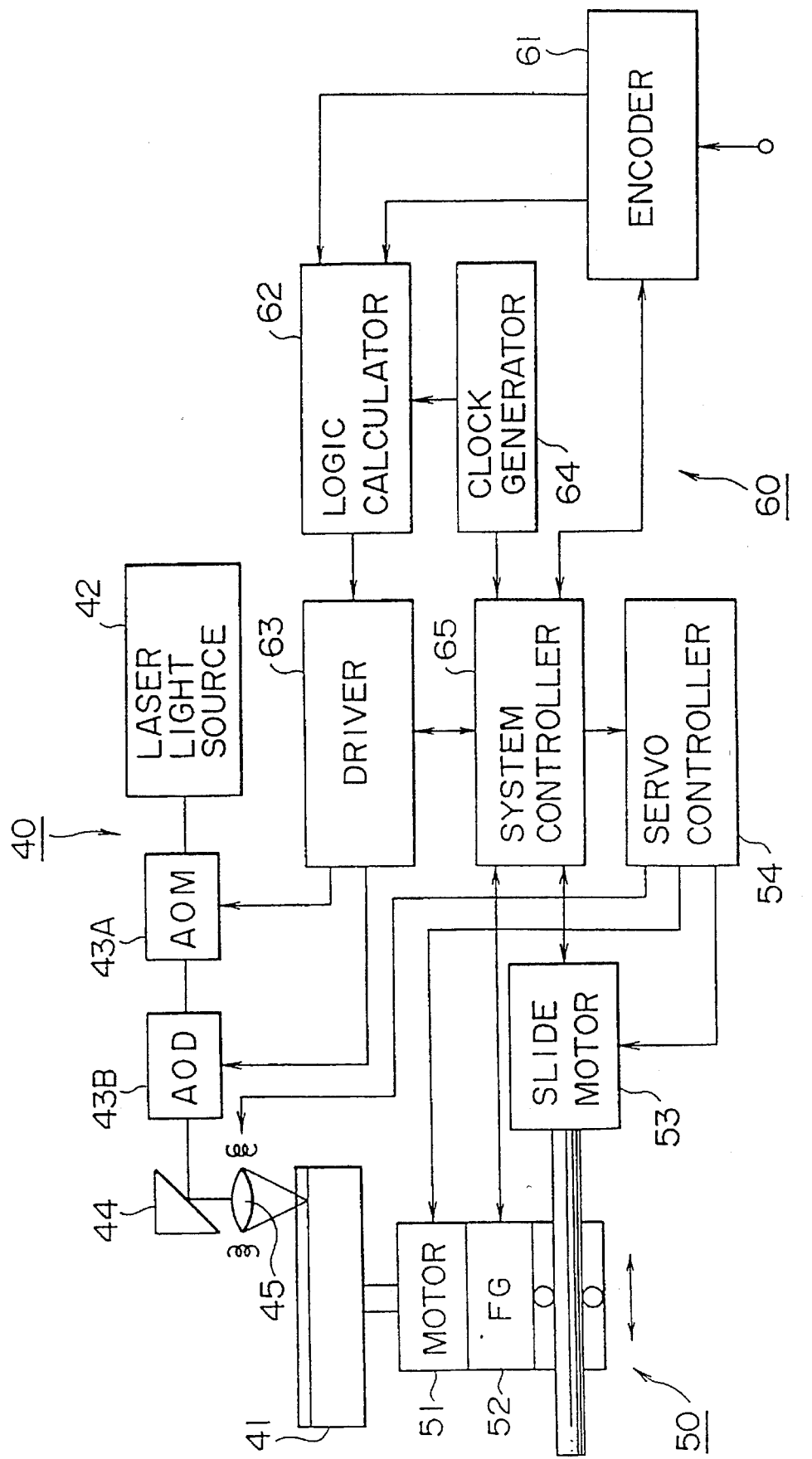
FIG. 4 is a block diagram of a cutting system for the recording medium of the invention.

Referring now to FIG. 4, a description will be given on the optical disc recording method for representing the data A, B, C, M on the tracks as in the embodiment.

The processes for manufacture of read-only optical discs are broadly divided into a mastering process and a replication process. The mastering process is executed for completing a stamper to be used in the subsequent replication process. And the replication process is executed for mass production of optical discs which are replications of the stamper.

More specifically, in the mastering process, a polished glass substrate is coated with a photoresist, and the light sensitive film thus formed is exposed to a laser beam (herein called cutting) to thereby record the data. The data to be recorded here need to be prepared, and the preparatory process for such data is termed "premastering". Upon termination of the data recording operation, predetermined steps for development and so forth are executed, and then the data are transferred onto a metallic surface by electroforming or the like, thereby producing a stamper which is required for replication of optical discs.

Subsequently the data on the stamper are transferred onto a plastic substrate by the art of injection or the like with such stamper. After providing a reflecting film, predetermined steps of shaping a desired disc contour and so forth are executed to complete an optical disc as a final product. Accordingly, the medium recording method of the present invention is applied to the premastering and the cutting mentioned above.

The cutting apparatus comprises, as shown in FIG. 4 for example, an optical unit 40, a driving unit 50 and a signal processing unit 60. In the optical unit 40, a laser beam is irradiated to the glass substrate 41 coated with the photoresist to perform the cutting. Subsequently the driving unit 50 drives the glass substrate 41 to rotate. And the signal processing unit 60 converts the input data to record data while controlling both the optical unit 40 and the driving unit 50.

The optical unit 40 comprises a laser light source 42, an optical modulator 43A, an optical deflector 43B, a prism 44 and an objective lens 45. The laser light source 42 consists of, e.g., a He-Cd laser. The optical modulator 43A is of acoustic type for modulating the output light of the laser light source 42 by switching on or off the same in accordance with the record data. The optical deflector 43b is also of acoustic type for deflecting the output light of the laser light source 42 in accordance with the record data. Meanwhile the prism 44 deviates the optical axis of the modulated beam obtained from the optical deflector 43B, and the objective lens 45 condenses the modulated beam reflected through the prism 44 and irradiates the beam onto the photoresist surface of the glass substrate 41.

The driving unit 50 comprises a motor 51, a frequency generator 52, a slide motor 53 and a servo controller 54. The motor 51 drives the glass substrate 41 to rotate at a predetermined constant angular velocity. The frequency generator 52 generates FG pulses for detecting the rotation speed of the motor 51. The slide motor 53 displaces the glass substrate 41 in the radial direction thereof. And the servo controller 54 controls the rotation speeds of the motor 51 and the slide motor 53 and also the focusing of the objective lens 45. The signal processing unit 60 comprises an encoder 61, a logic calculator 62, a driver 63, a clock generator 64 and a system controller 65. The encoder 61 forms input data by adding an error correction code and so forth to the source data received from, e.g., a computer (not shown). The logic calculator 62 executes a predetermined logic calculation of the input data from the encoder 61 to thereby form record data. The driver 63 serves to drive both the optical modulator 43A and the optical deflector 43B in accordance with the recording data inputted from the logic calculator 62. Meanwhile the clock generator 64 supplies clock pulses to the logic calculator 62 and so forth. And the system controller 65 serves to control the servo controller 54 and so forth in accordance with the clock pulses supplied thereto.

During the operation of the cutting apparatus shown in FIG. 4, the servo controller 54 drives the motor 51 to rotate the glass substrate 41 at a constant angular velocity while driving the slide motor 53 to displace the glass substrate 41 at a rate of 0.8 μm per rotation, i.e., in a manner to attain a track pitch of 0.8 μm.

And simultaneously the light emitted from the laser light source 42 is converted via the optical modulator 43A and the optical deflector 43B into a modulated beam based on the record data, and then such modulated beam is irradiated from the objective lens 45 onto the photoresist surface of the glass substrate 41. As a result, the photoresist is exposed in conformity with the record data.

Meanwhile the input data with the error correction code and so forth added thereto by the encoder 61 is supplied to the logic calculator 62, where the record data is produced. The logic calculator 62 includes a memory having a capacity to store the record data of at least one track. More specifically, the logic calculator 62 stores in its memory the 4-value data A, B, C, M recorded on a preceding track and executes a predetermined logic calculation with respect to such stored record data and the input data. As a result, the data to be recorded on the next track, i.e., the 4-value data A, B, C, M are formed in the logic calculator 62.

The record data is supplied to the driver 63, which then controls the optical modulator 43A in its on-state at the bit timing when the record data is A, B or C, or controls the optical modulator 43A in its off-state at the bit timing when the record data is M. The driver 63 further controls the optical deflector 43B in such a manner that the deflection thereof is turned in the direction +α or −α at the bit timing when the record data is B or C.

Consequently, in accordance with the 4-value record data, there are formed on the glass substrate 41 an exposed area corresponding to the pit on the track center, an exposed area corresponding to the wobble pits having a deviation in the directions +α and −α, and a nonexposed area used as a mirror portion. Thereafter a stamper is produced through developing and electroforming steps, and optical discs are manufactured by the use of such stamper.

Hereinafter a description will be given of the method of reproducing the data from the optical disc of the embodiment. It is necessary to exactly extract the data of patterns P1–P16 shown in FIG. 2 out of the diffracted light data obtained from the optical disc 1 by the 2-track simultaneous scan.

Figure 5:
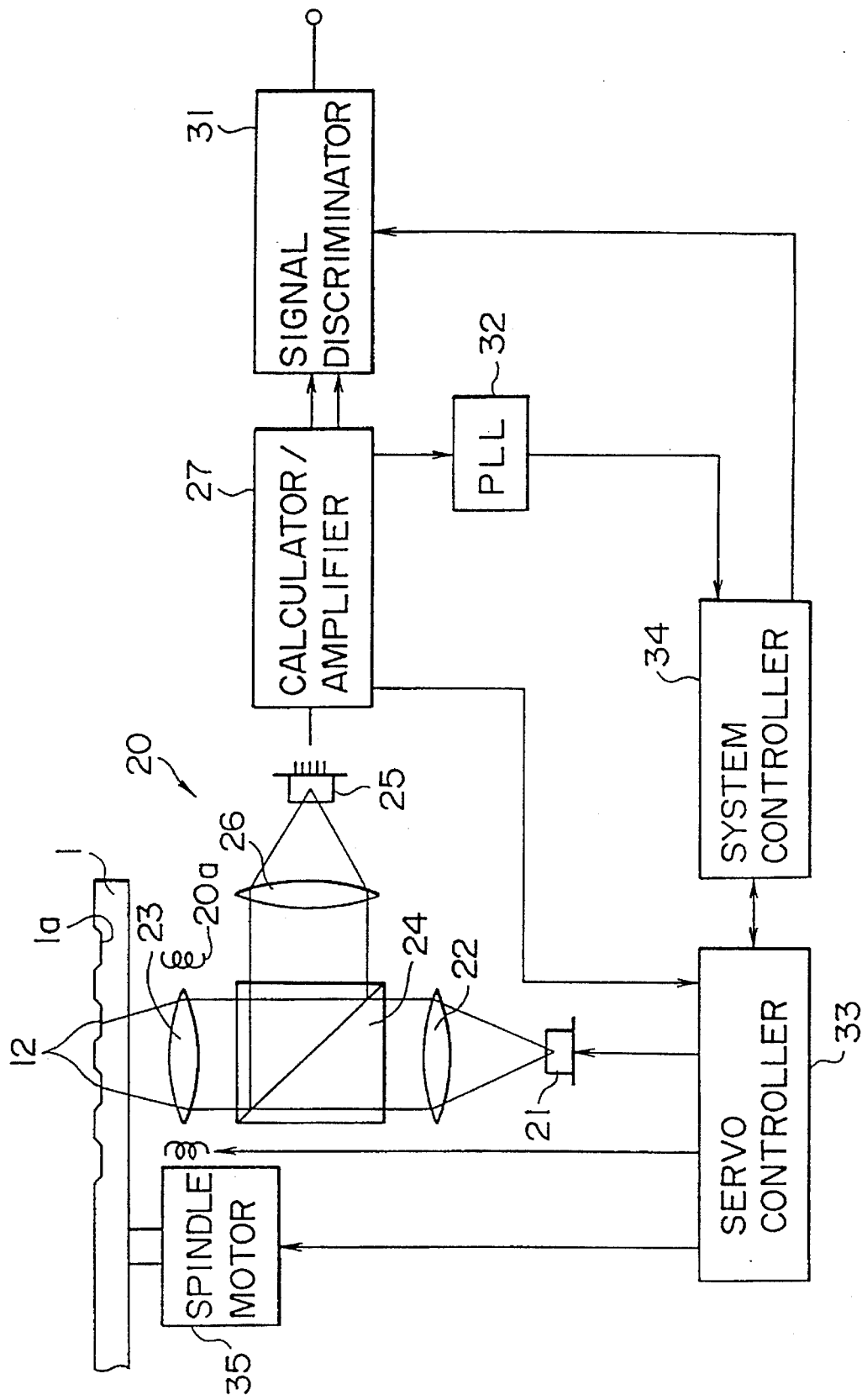
FIG. 5 is a block diagram of a playback apparatus for the recording medium.
Figure 6:
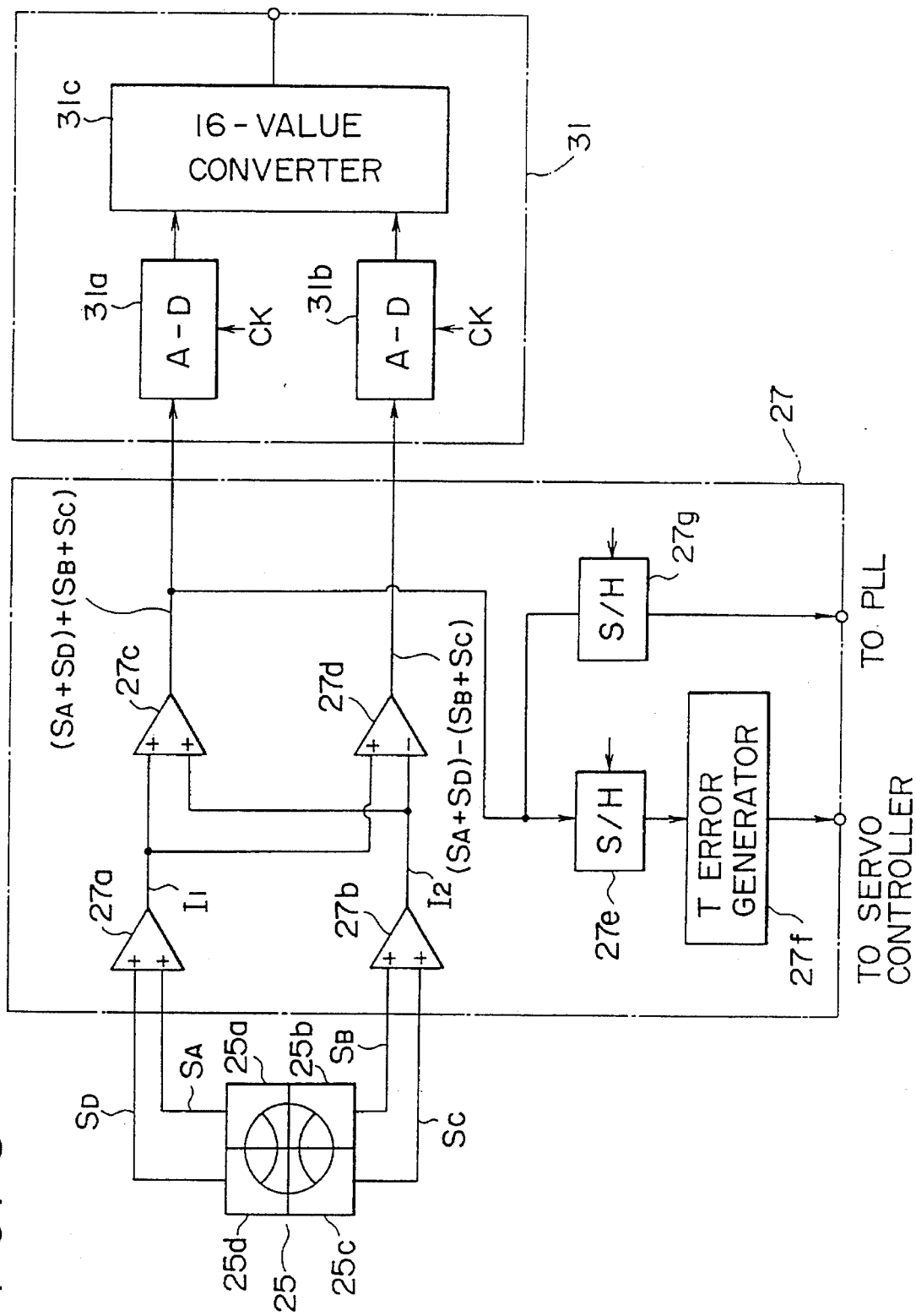
FIG. 6 is a block diagram of principal components in the playback apparatus for the recording medium.

First the constitution of the playback apparatus will be described below with reference to FIGS. 5 and 6. In FIG. 5, there are shown a laser light source 21, and a collimator lens 22 where the light beam emitted from the laser light source 21 is collimated. Denoted by 23 is an objective lens for focusing the collimated light beam, which is obtained through the collimator lens 22, on the recording surface of the optical disc 1. A beam splitter 24 is provided for splitting the input into the light beam emitted from the laser light source 21 and the light beam reflected from the recording surface of the optical disc 1. A detector 25 receives the light beam reflected from the recording surface of the optical disc 1. The light receiving surface of the detector 25 is divided into four areas 25a, 25b, 25c, 25d as illustrated in FIG. 6. The boundary between the light receiving areas 25a and 25b, and the boundary between the areas 25c and 25d are directionally coincident with the tracks of the optical disc 1 or the tangential direction of the tracks. Denoted by 26 is a condenser lens for focusing on the optical detector 25 the light beam separated by the beam splitter 24 and reflected from the optical disc 1. Although not shown, a cylindrical focus error detecting lens is disposed between the condenser lens 26 and the optical detector 25. An optical head 20 is constituted of the above-described laser light source 21, collimator lens 22, objective lens 23, beam splitter 24, optical detector 25 and condenser lens 26. The optical head 20 is moved by a feed mechanism (not shown) in the radial direction of the optical disc 1.

The objective lens 23 is driven by an actuator (not shown), which is incorporated in the optical head 20, in the focusing direction or the tracking direction. The spot of the light beam emitted on the recording surface of the optical disc 1 through the objective lens has a diameter of 1.6 μm on the recording surface. Since the track pitch of the optical disc 1 is 0.8 μm as mentioned, the mutually adjacent tracks on the optical disc 1 are scanned simultaneously. Denoted by 27 is a calculator/amplifier to which the output of the detector 25 is supplied. The calculator/amplifier 27 generates a focusing signal by the astigmatism in accordance with the output signal of the detector 25. As will be described later, the calculator/amplifier 27 also generates a tracking error signal and supplies the same to a servo controller 33 together with the focusing error signal. The calculator/amplifier 27 further generates an RF signal, i.e., a sum signal which corresponds to the sum of the detection signals obtained respectively from the light receiving areas 25a, 25b, 25c, 25d of the detector 25, and a push-pull signal, i.e., a difference signal which corresponds to the difference between the sum of the detection signals from the light receiving areas 25a, 25d and the sum of the detection signals from the light receiving areas 25b, 25c.

A discriminator 31 receives both the RF signal and the push-pull signal from the calculator/amplifier 27 and reproduces the 16-value data in accordance with such RF signal and push-pull signal. A PLL circuit 32 is provided for reproducing the clock pulses included in the RF signal obtained from the calculator/amplifier 27. A servo controller 33 receives the focusing error signal and the tracking error signal from the calculator/amplifier 27 and generates a focus control signal and a tracking control signal in accordance with the focusing error signal and the tracking error signal. The focus control signal and the tracking control signal thus obtained are then supplied to a coil 20a of the actuator to execute focus and tracking servo control actions with respect to the objective lens 23. The servo controller 33 drives the feed mechanism in response to a track jump command from a system controller 34 to thereby displace the optical head 20 in the radial direction of the optical disc 1. The system controller 34 receives the clock pulses from the PLL circuit 32 and controls the operations of both the servo controller 33 and the signal discriminator 31 in accordance with the clock pulses. Denoted by 35 is a spindle motor for rotating the optical disc 1 at a constant angular velocity (CAV).

FIG. 6 shows the constitution of principal components in the calculator/amplifier 27 and the signal discriminator 31 for generating 16-value data and a tracking error signal. There are included adders 27a, 27b and 27c. The adder 27a receives detection signals SA and SD from the light receiving areas 25a and 25d respectively. Meanwhile the adder 27b receives detection signals SB and SC from the light receiving areas 25B and 25C; and the adder 27c receives output signals I1 and I2 from the adders 27a and 27b respectively. The adder 27a executes an addition of the detection signals SA and SD (SA+SD=I1) obtained from the light receiving areas 25a and 25d. The adder 27b executes an addition of the detection signals SB and SC (SB+SC=I2) obtained from the light receiving areas 25b and 25c respectively. And the adder 27c executes an addition of the output signals I1 and I2 (I1+I2) obtained from the adders 27a and 27b respectively, and delivers the resultant sum signal as an RF signal. Denoted by 27d is a subtracter supplied with the output signals I1 and I2 of the adders 27a and 27b. The subtracter 27d subtracts the output signal I2 of the adder 27b from the output signal I1 of the adder 27a (i.e., I1–I2) and delivers the resultant difference signal as a push-pull signal. There are also included sample-hold circuits 27e and 27g for sampling the output RF signal of the adder 27c at a predetermined timing. Denoted by 27f is a tracking error signal generator which, as will be described later, generates a tracking error signal in response to the output of the sample-hold circuit 27e. Further shown are analog-to-digital (A-D) converters 31a, 31b and a 16-value converter 31c. The A-D converter 31a receives the RF signal from the adder 27c, while the A-D converter 31b receives the push-pull signal from the subtracter 27d. The 16-value converter 31c has a conversion table therein to discriminate the data on the basis of the RF signal and the push-pull signal.

The RF signal outputted from the adder 27c is sampled at a predetermined timing in the sample-hold circuit 27e and then is supplied to the signal generator 27f, which generates a tracking error signal in accordance with the RF signal sampled and held in the circuit 27e. The RF signal outputted from the adder 27c is supplied also to the sample-hold circuit 27g and is sampled therein at a predetermined timing. And the output of the sample-hold circuit 27g is supplied as clock data to the PLL circuit 32.

The RF signal outputted from the adder 27c is converted to digital data by the A-D converter 31a and then is supplied to the 16-value converter 31c. Meanwhile the push-pull signal outputted from the subtracter 27d is converted to digital data by the A-D converter 31b and then is supplied also to the 16-value converter 31c. Subsequently in the 16-value converter 31c, a matrix calculation is executed with respect to the digital RF signal and the digital push-pull signal supplied from the A-D converters 31a and 31b respectively, so that the aforementioned 16-value data (P1–P16) are discriminated.

Hereinafter a description will be given on the data extraction performed by the 16-value converter 31c in the playback apparatus of the constitution mentioned above.

Figure 7:
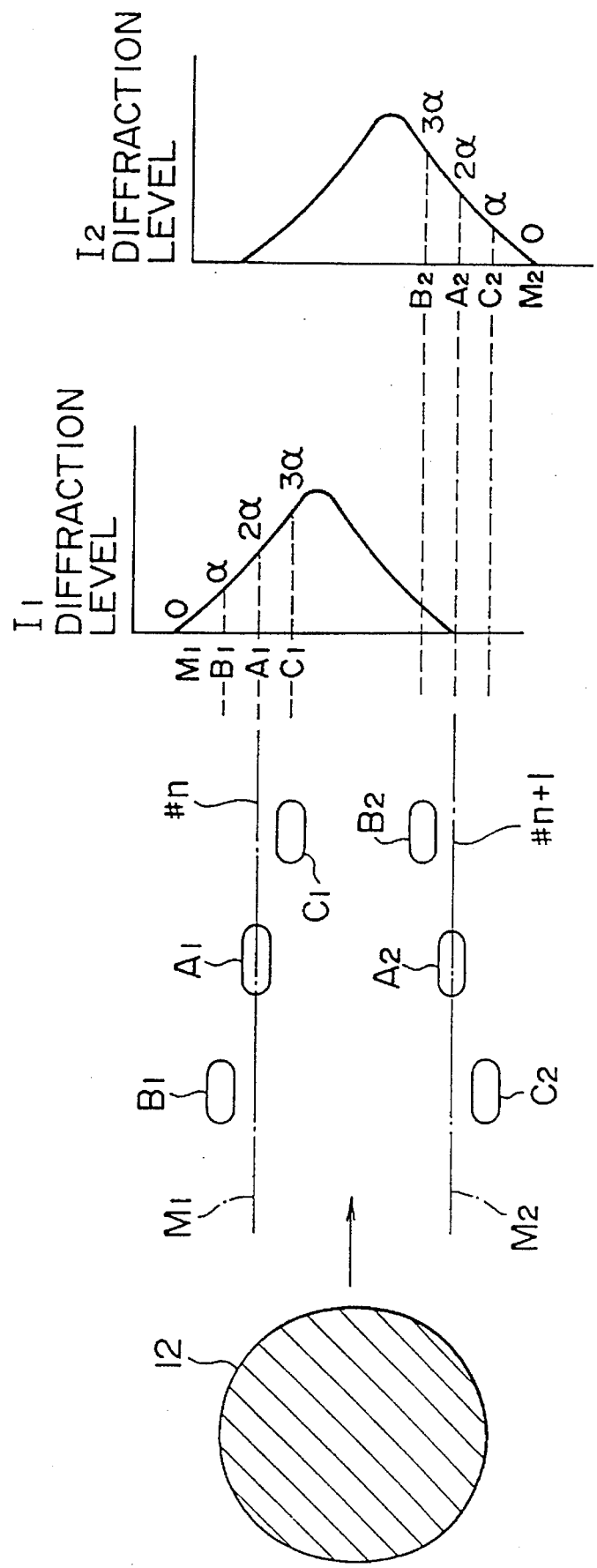
FIG. 7 is an explanatory diagram illustrating nonwobble pits and wobble pits in the embodiment with diffraction levels obtained by mirror portions.

Suppose now that, as shown in FIG. 7, the mirror portion M1 and the pits A1, B1, C1 are existent on the track #n with respect to the beam spot 12, and the mirror portion M2 and the pits A2, B2, C2 are existent on the track #n+1. The diffraction level I1 obtained by the light receiving areas 25a, 25b of the detector 25 and the diffraction level I2 obtained by the light receiving areas 25b, 25c of the detector 25 correspond respectively to 0, α, 2α, 3α as shown in FIG. 7. FIG. 2C shows the diffraction levels I1 and I2 with regard to the patterns P1–P16 for the pattern of pits shown in FIG. 2A.

Since the RF signal is obtained through an addition of I1+I2, the diffraction level relative to the RF signal has a distribution ranging from 0 to 6 in conformity with the patterns P1–P16 as shown in FIG. 2D. Meanwhile the push-pull signal obtained through a subtraction of I1–I2 has a diffraction level distribution ranging from –3 to +3 in conformity with the patterns P1–P16 as shown in FIG. 2E.

Figure 8A:
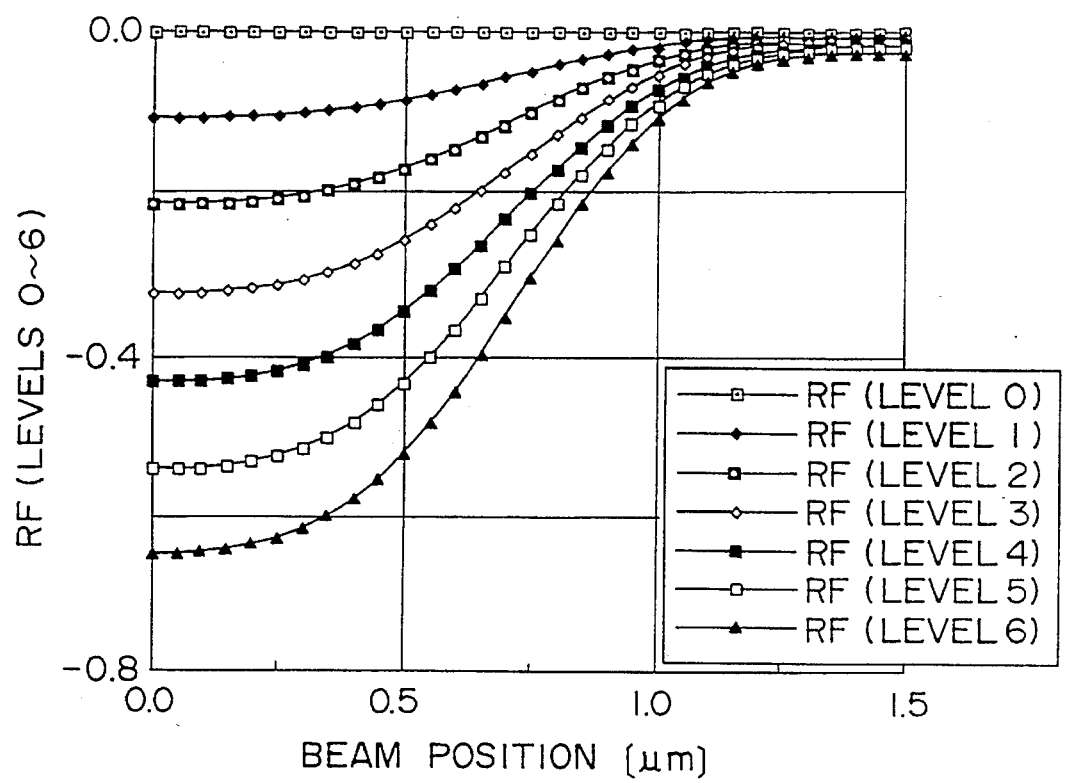
FIGS. 8A and 8B graphically show RF signal values and push-pull signal values in the playback method of the invention.
Figure 8B:
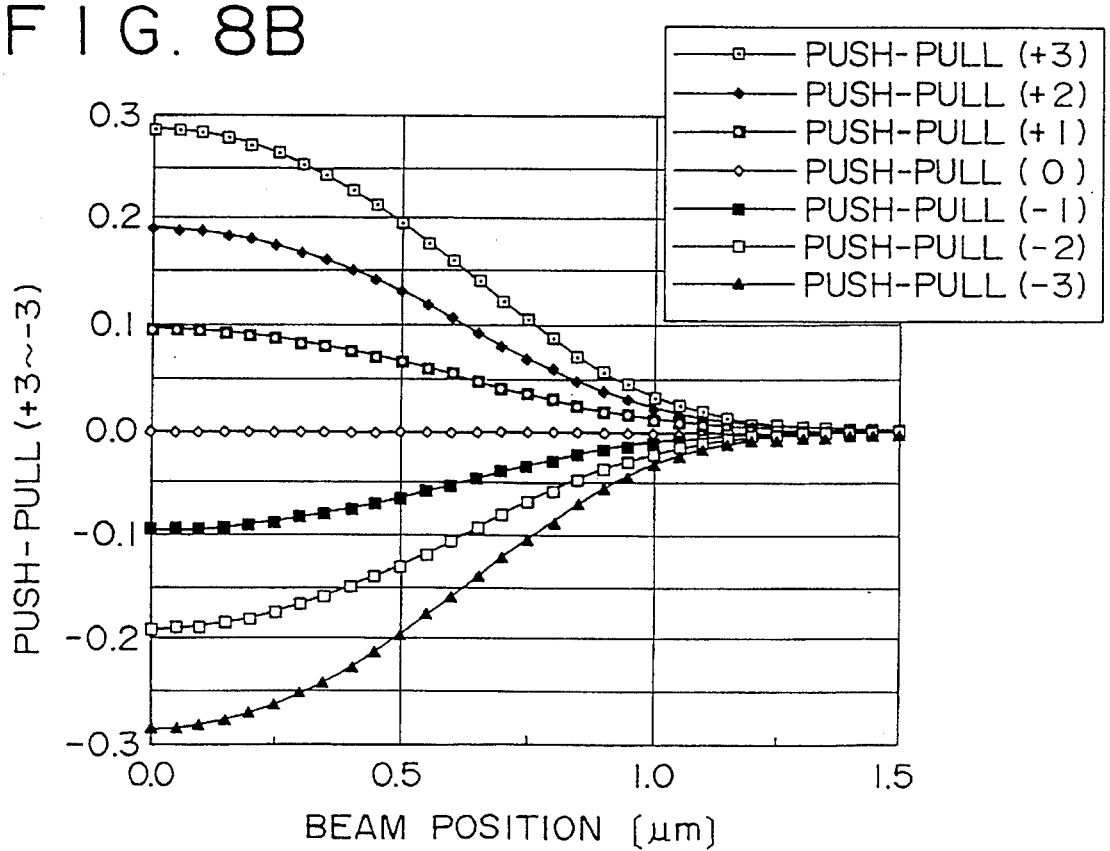
Figure 9:
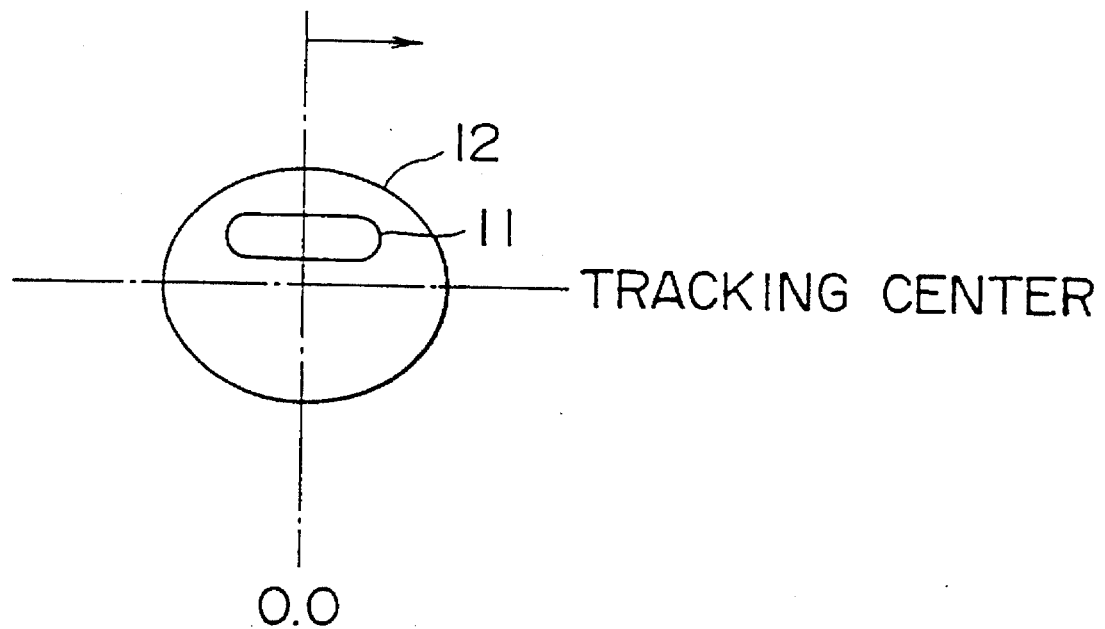
FIG. 9 is an explanatory diagram of a beam position corresponding to the data shown in FIG. 8.

FIGS. 8A and 8B graphically show such level distributions relative to the RF signal (modulation degree) and the push-pull signal, wherein the ordinate represents the values calculated on the basis of 0.0 as a mirror level, and the abscissa represents the beam positions when the beam spot 12 is displaced in the scanning direction during the playback mode with the point 0.0 taken as a pit center. Therefore, by executing extraction of the data in accordance with the clock pulse corresponding to the beam position 0.0, the data relative to the RF signal can be extracted in a level range of 0 to –0.65, and the data relative to the push-pull signal can be extracted in a level range of –0.3 to +0.3.

Figure 10:
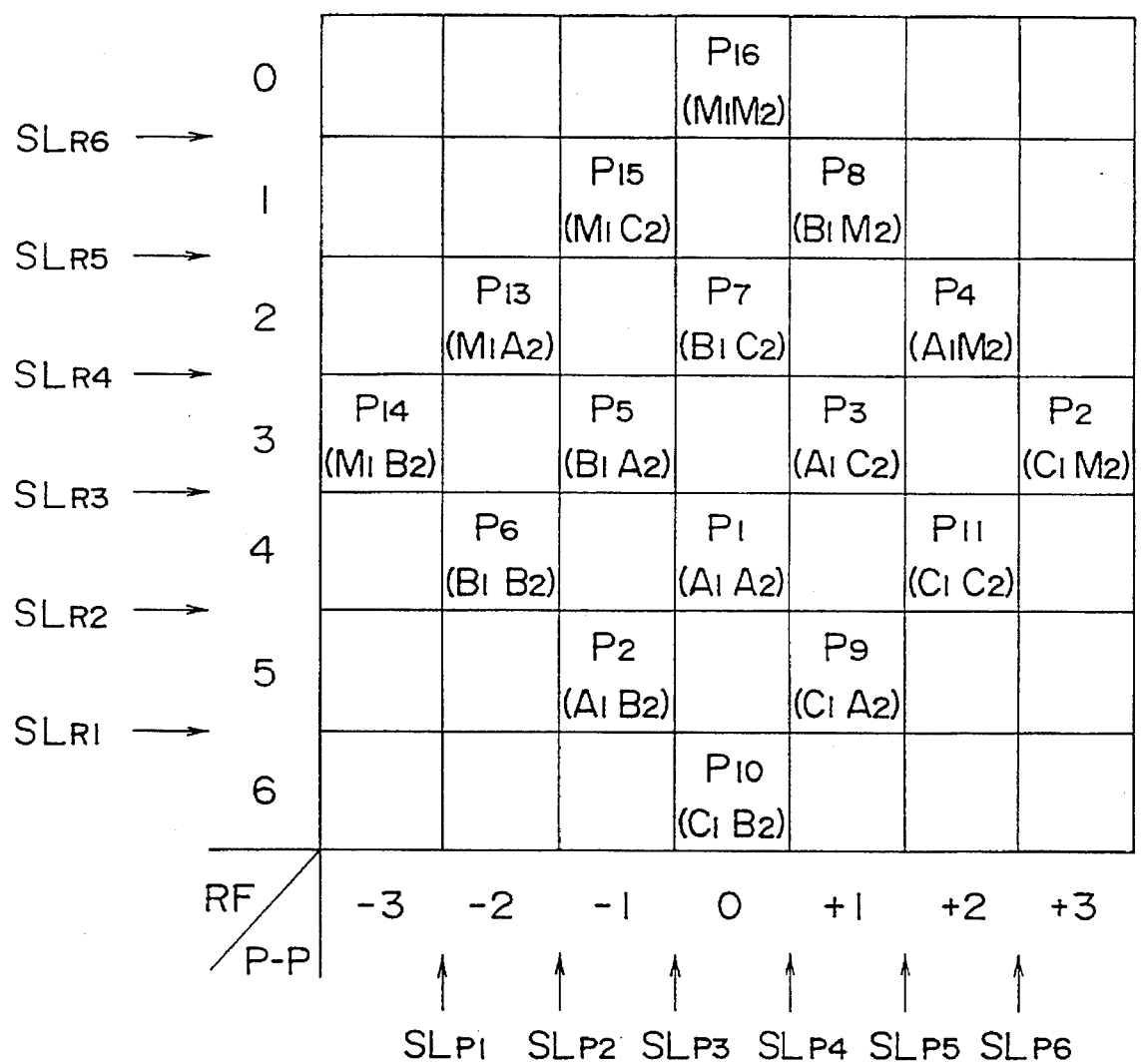
FIG. 10 is an explanatory diagram of a data map for discriminating 16 values in the playback method of the invention.

Thus, 7-class level discrimination is possible for both the RF signal and the push-pull signal, and the individual patterns P1–P16 are positioned independently of one another on the data map conforming with the level classes of the RF signal and the push-pull signal, as shown in FIG. 10. Consequently, since such data map is stored in the 16-value converter 31c, it becomes possible to easily identify, from the values of the digitized input RF signal and push-pull signal, which of the patterns P1–P16 has been scanned for reproduction by the beam spot 12.

For example, when the RF signal value is –0.2 (=2 in the data map) and the push-pull signal value is 0.0 (=0 in the data map), the result is discriminated as a pattern P7, and the data on the track #n is reproduced as the data B of the +α wobble pit, while the data on the track #n+1 is reproduced as the data C of the –α wobble pit.

Since the data map shown in FIG. 10 is stored as a conversion table in the 16-value converter 31c, any of the patterns P1–P16 can be discriminated on the basis of the RF signal value and the push-pull signal value. For the purpose of achieving such discrimination, it is necessary to determine, as shown in FIG. 10, threshold values $SL_{R1}$–$SL_{R6}$ for deciding the RF signal value as a level in a range of 0 to 6, and also threshold values $SL_{P1}$–$SL_{P6}$ for deciding the push-pull signal value as a level in a range of –3 to +3.

If the reflectivities of various kinds of optical discs are equal to one another or none of intercode interference is observed on the optical disc 1, the threshold values $SL_{R1}$–$SL_{R6}$ and $SL_{P1}$–$SL_{P6}$ may be determined on the basis of experimental data or the like and may be stored in advance. Practically, however, the reflectivities are slightly different from one another on the individual optical discs, and the RF and push-pull signal values based on the data A, B, C, M may be varied by some intercode interference.

In view of such practical circumstances, the 16-pattern data shown in FIG. 2A are stored previously as reference data in a predetermined area of a n predetermined period (e.g., in a servo area in the sampled servo system) on the optical disc 1. And in the playback mode, optimal threshold values for $SL_{R1}$–$SL_{R6}$ and $SL_{P1}$–$SL_{P6}$ are calculated from the RF signal value and the push-pull signal value obtained by reproducing the 16 pattern data from the reference data. These optimal threshold values selected are stored in the memory incorporated in the 16-value converter 31c, whereby it is rendered possible to attain exact 16-value discrimination.

It is also possible to obtain tracking servo data by previously recording such reference data in a servo area in the sampled servo system, e.g., in the first area of each segment within a sector which divides the track. For tracking, the beam spot 12 is controlled at an intermediate position between a pair of mutually adjacent tracks. The tracking control is realized by the RF signal value sampled at the reproduction timing of the patterns P1, P4 and P13 (wobble pits 11 representing the data A) in FIG. 2A.

Hereinafter a description will be given on how the tracking control is executed in this embodiment.

Figure 11:
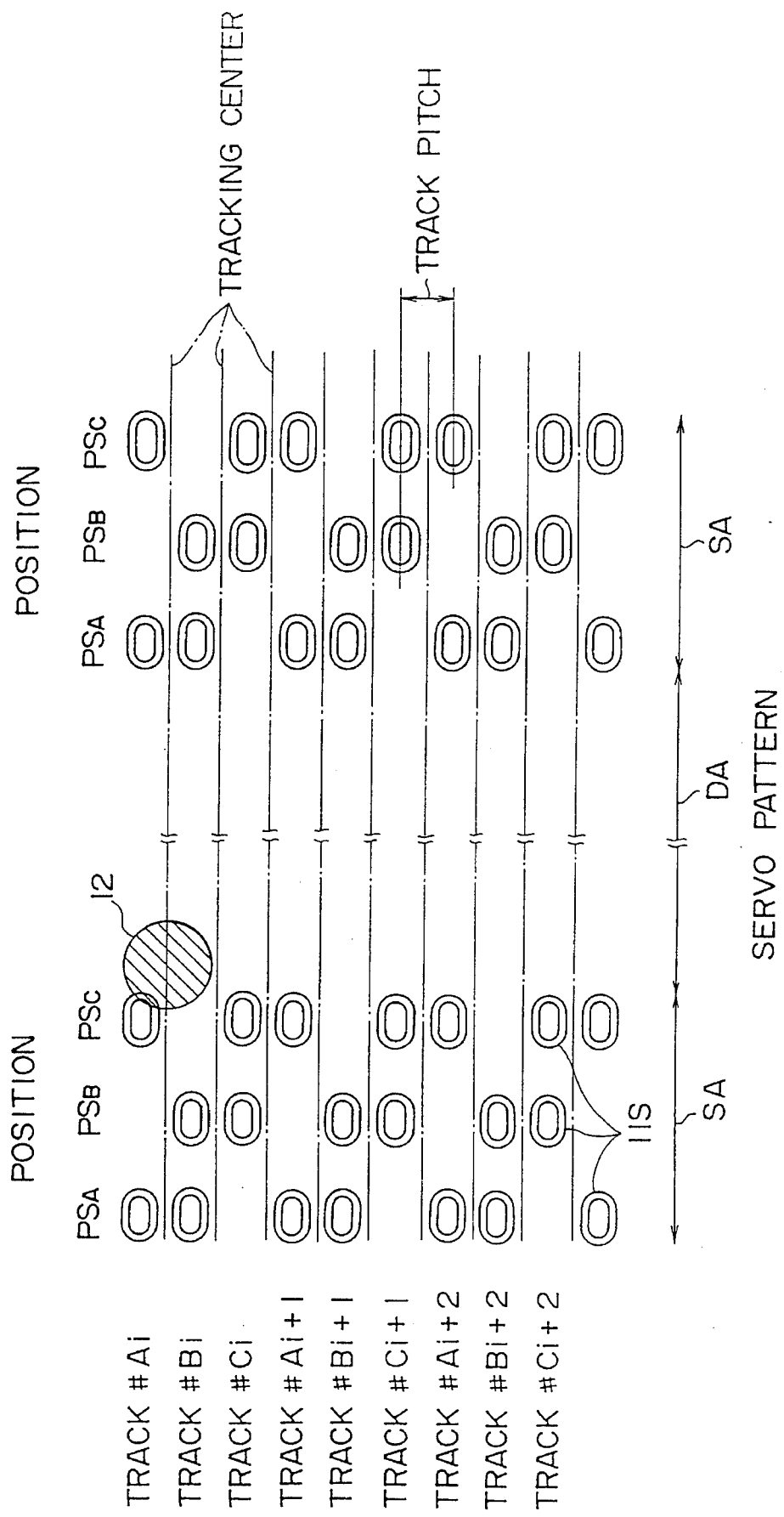
FIG. 11 is an explanatory diagram of a servo area utilizing the reference data in the embodiment.

FIG. 11 shows, with regard to tracks #i to #Ci+1, patterns P1, P4 and P13 (servo pits 11S) recorded in the servo area SA as a portion of the reference data or separately therefrom.

On a pair of tracks #Ai and #Bi, pattern P1 is disposed at position $PS_A$, pattern P13 at position $PS_B$, and pattern P4 at position $PS_C$, respectively. Meanwhile on a pair of tracks #Bi and #Ci, pattern P4 is disposed at position $PS_A$, pattern P1 at position $PS_B$, and pattern P13 at position $PS_C$, respectively. Also on a pair of tracks #Ci and #Ai+1, pattern P13 is disposed at position $PS_A$, pattern P4 at position $PS_B$, and pattern P1 at position $PS_C$, respectively. Further on the following tracks, servo pits 11S are formed similarly to the above. Denoted by DA is a data area provided in succession to the servo area SA.

When the RF signal is outputted from the adder 27c incorporated in the calculator/amplifier 27 shown in FIG. 6, the RF signal is supplied to the sample-hold circuits 27e and 27g. Then in the circuit 27g, the RF signal is sampled at the reproduction timing of the position $PS_A$ for example and is supplied as clock data to the PLL circuit 32.

Figure 12:
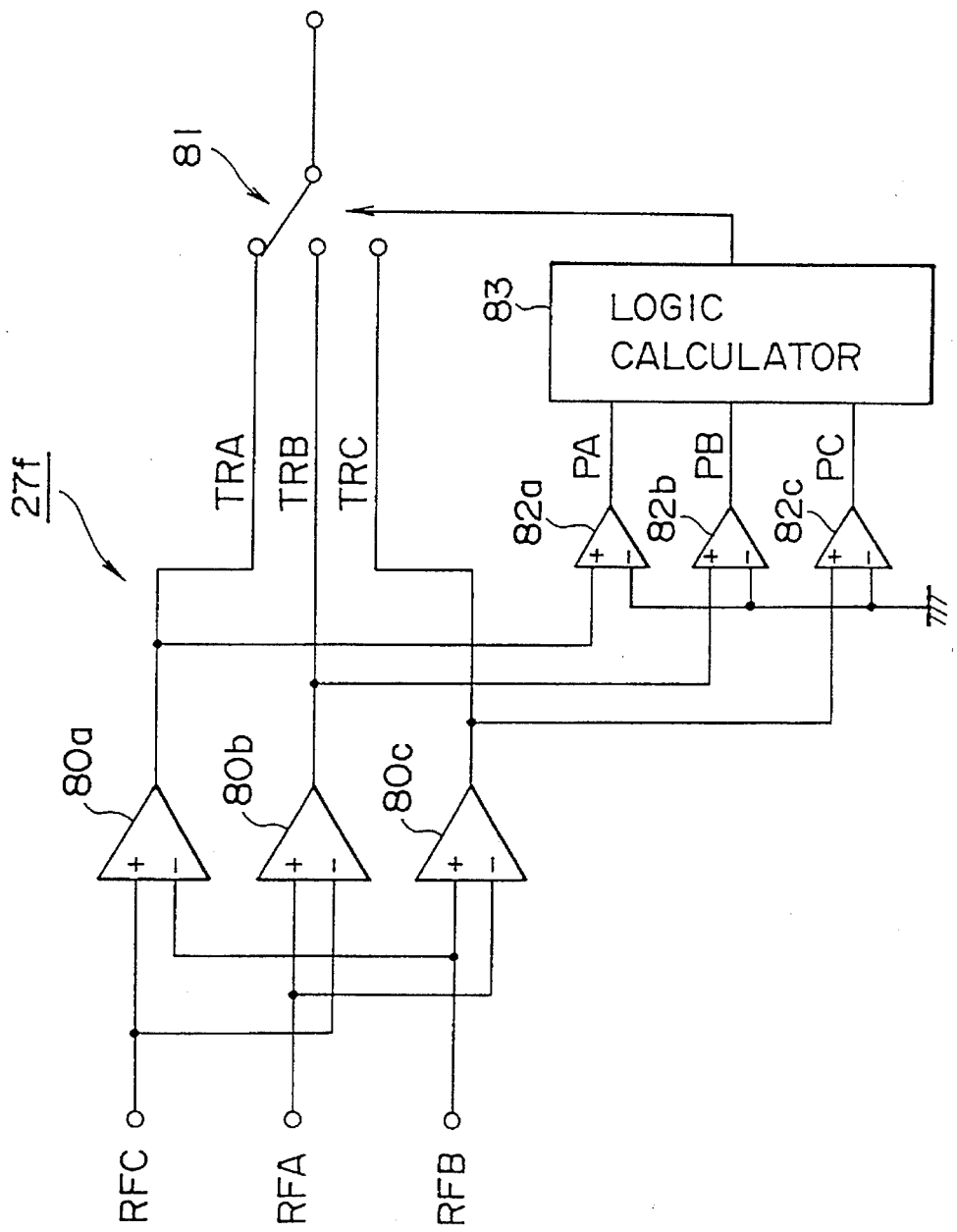
FIG. 12 is a block diagram of a tracking servo signal generator in the embodiment.
Figure 13A:
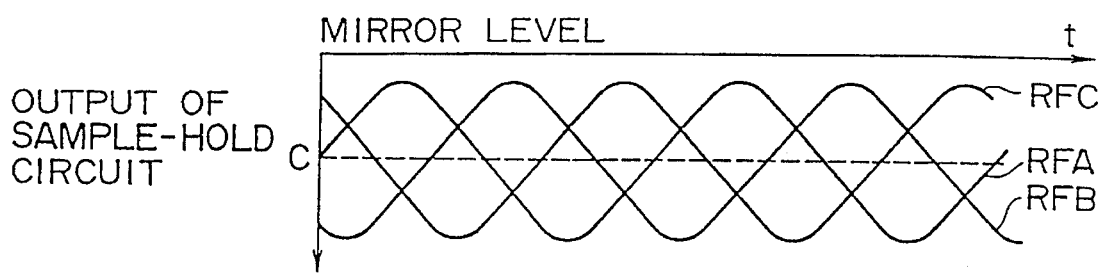
FIGS. 13A to 13E are explanatory diagrams of the operation for generating a tracking servo signal in the embodiment.

Meanwhile sampling clock pulses are generated, on the basis of the clock signal reproduced by the PLL circuit 32, in the system controller 34 synchronously with the positions $PS_A$, $PS_B$, $PS_C$ and then are supplied to the sample-hold circuit 27. In this circuit, the RF signal is sampled by using the sampling clock pulses supplied thereto, so that 3-phase signals RFA, RFB, RFC having mutually different phases are produced as shown in FIG. 13A, and such signals are supplied to the tracking error signal generator 27f. As shown in FIG. 12, the tracking error signal generator 27f comprises differential amplifiers 80a, 80b, 80c, a multiplexer 81, comparators 82a, 82b, 82c, and a logic calculator 83. The differential amplifiers 80a, 80b, 80c calculate the mutual differences among the RF signals RFA, RFB, RFC outputted from the sample-hold circuit 27e. The multiplexer 81 selectively switches the output signals of the differential amplifiers 80a, 80b, 80c in accordance with the output of the logic calculator 83. The comparators 82a, 82b, 82c receive the output signals of the differential amplifiers 80a, 80b, 80c respectively and detect the polarities of such output signals supplied. The logic calculator 83 receives the output signals PA, PB, PC of the comparators 82a, 82b, 82c and executes a logic calculation for each of such output signals PA, PB, PC to thereby generate a control signal for controlling the multiplexer 81.

Figure 13B:
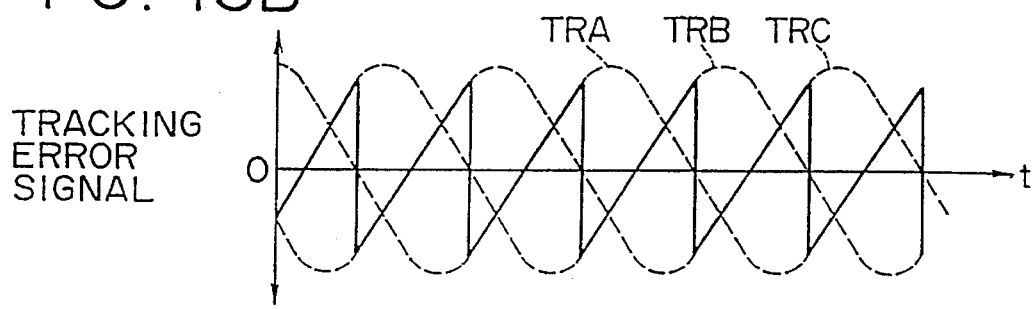

As indicated by broken lines in FIG. 13B, the differential amplifier 80a subtracts the RF signal RFB from the RF signal RFC to thereby generate a tracking error signal TRA. Meanwhile the differential amplifier 80b subtracts the RF signal RFC from the RF signal RFA to thereby generate a tracking error signal TRB. And the differential amplifier 80c subtracts the RF signal RFA from the RF signal RFB to thereby generate a tracking error signal TRC. Therefore such tracking error signals TRA, TRB, TRC are composed of sinusoidal waves having a phase difference of 120° from one another and also having a phase lead of 90° to the RF signals RFA, RFB, RFC respectively. The tracking error signals TRA, TRB, TRC thus generated are supplied to the multiplexer 81 and the comparators 82a, 82b, 82c.

Figure 13C:
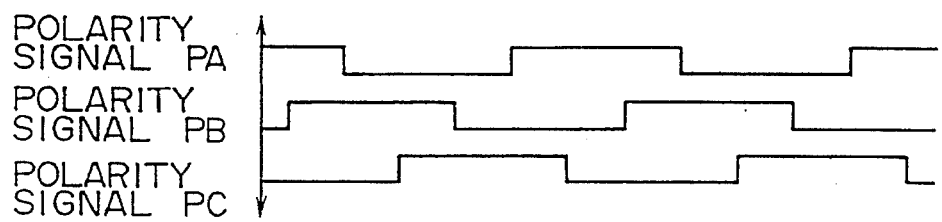
Figure 13D:
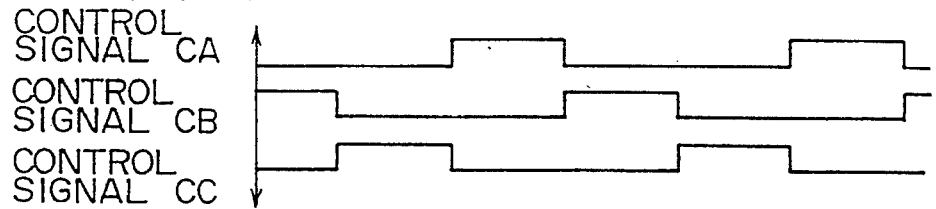
Figure 13E:
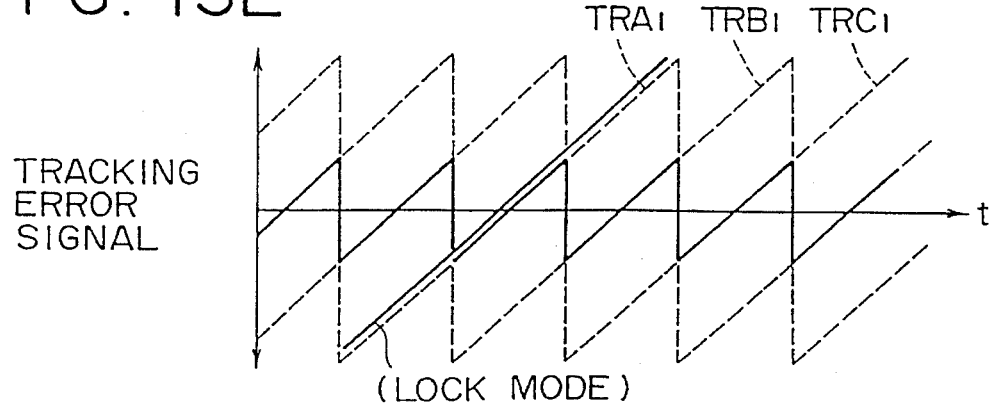

The comparators 82a, 82b, 82c detect the polarities of the tracking error signals TRA, TRB, TRC respectively as shown in FIG. 13C, and generate polarity signals PA, PB, PC. These polarity signals PA, PB, PC become "1" at a positive level for example. The comparators 82a, 82b, 82c supply such signals to the logic calculator 83. Subsequently the logic calculator 83 executes calculations (explained below) of Eqs. (1) to (3) to generate control signals CA, CB, CC of which phases are mutually different by 120° as shown in FIG. 13D. The multiplexer 81 is controlled by the control signals CA, CB, CC in such a manner as to select the tracking error signal TRA when the control signal CA is "1", or to select the tracking error signal TRB when the control signal CB is "1", or to select the tracking error signal TRC when the control signal CC is "1".

$$CA = PC \wedge INV(PB) \quad (1)$$

$$CB = PA \wedge INV(PC) \quad (2)$$

$$CC = PB \wedge INV(PA) \quad (3)$$

In Eqs. (1) to (3), "$\wedge$" and "INV ()" denote a logical product and a negative logic, respectively.

Consequently the multiplexer 81 generates a tracking error signal where, as indicated by a solid line in FIG. 13B, the three-phase tracking error signals TRA, TRB, TRC having mutually different phases are periodically switched. The tracking error signal thus outputted from the multiplexer 81 is processed in the servo loop for phase compensation and then is supplied to the actuator incorporated in the optical head, so that the objective lens 23 is displaced by the actuator in the radial direction of the optical disc 1 in a manner to reduce the tracking error signal to zero.

Due to such tracking servo control, the intermediate position between the paired adjacent tracks is regarded as a tracking center, and a scan for playback is executed to thereby read the 16-value pattern data from the paired tracks.

In this embodiment where wobble pits 11 are provided as data B or data C, it is possible, by utilizing such wobble pits 11, to perform tracking in a detrack state with a slight deviation from the tracking center.

Figure 14:
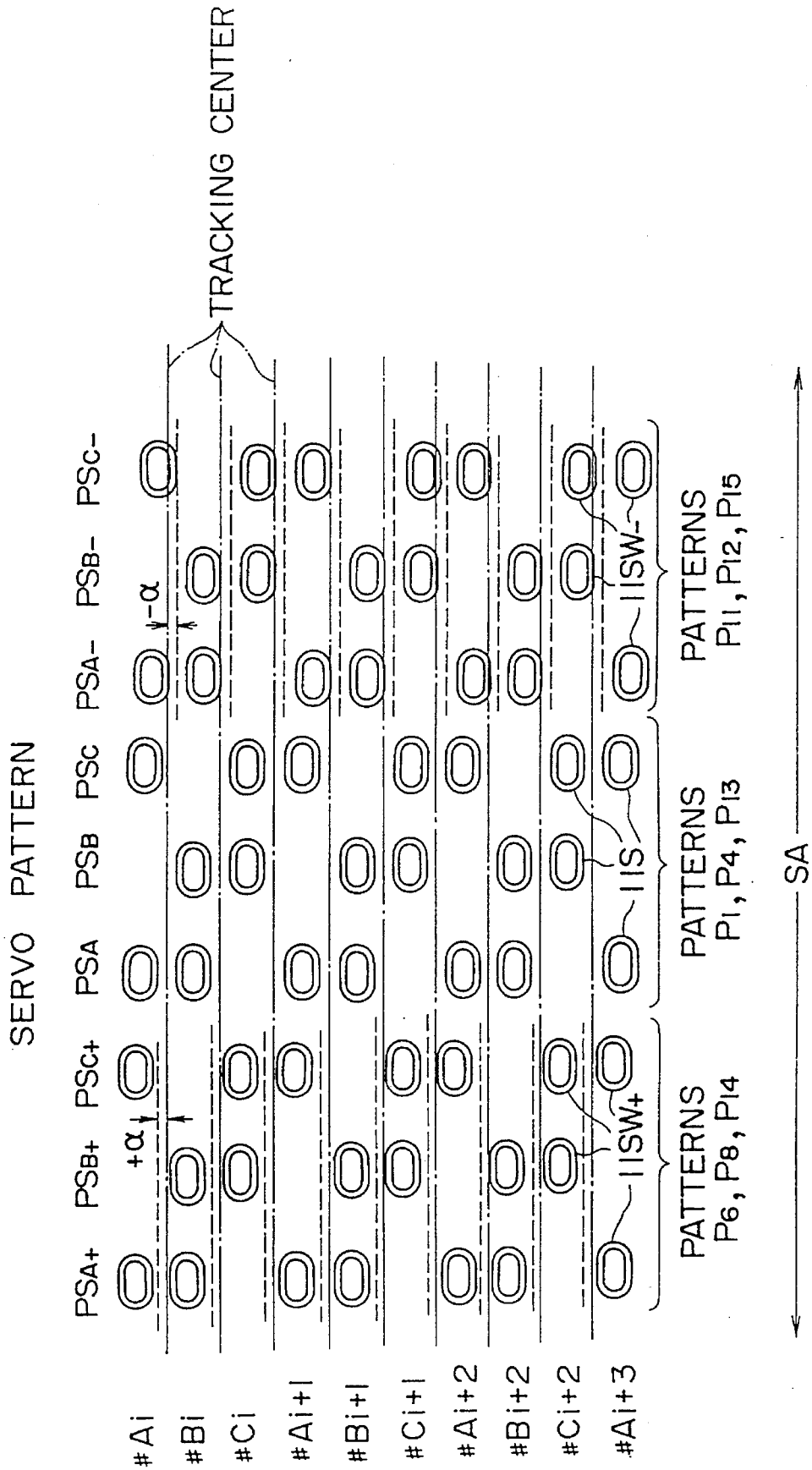
FIG. 14 is an explanatory diagram of a servo area which enables detrack tracking with deviations by utilizing the reference data in the embodiment.

As shown in FIG. 14, servo pits 11S composed of the aforementioned nonwobble pits are provided as a portion of the reference data or separately therefrom, and servo pits 11Sw+, 11Sw− are formed of wobble pits in the servo area SA.

More specifically, servo pits 11Sw+ are provided at positions $PS_{A+}$, $PS_{B+}$, $PS_{C+}$ by using the patterns P6, PS, P14 of the wobble pits having a deviation +α to represent the data B. And servo pits 11Sw− are provided at positions $PS_{A-}$, $PS_{B-}$, $PS_{C-}$ by using the patterns P11, P12, P15 of wobble pits having a deviation −α to represent the data C.

When a tracking error signal is generated as described from the RF signal based on the servo pits 11Sw+ at the positions $PS_{A+}$, $PS_{B+}$, $PS_{C+}$, then tracking control is performed with a deviation +α from the original tracking center. The original tracking center is indicated by a one-dot chained line.

And when a tracking error signal is generated from the RF signal based on the servo pits 11Sw− at the positions $PS_{A-}$, $PS_{B-}$, $PS_{C-}$, tracking control is performed with a deviation −α from the original tracking center.

Due to the execution of such tracking control, it becomes possible to enhance the function of discriminating the 16-value data despite harmful influence of crosstalk or the like, whereby the action is rendered applicable to verification.

Suppose now that there are some difficulties in deciding whether the data reproduced from one pair of tracks is the pattern P1 or P3.

Under such condition, if a playback operation is performed in a detrack state with a deviation $+\alpha$, data A is read as data C so that the actual pattern P1 (A1, A2) is discriminated as the pattern P11 (C1, C2). Also the actual pattern P3 (A1, C2) is discriminated as the pattern P12 (C1, M2) since data A is read as data C, and data C is read as data M.

Further in a playback operation performed in a detrack state with a deviation $-\alpha$, data A is read as data B so that the actual pattern P1 (A1, A2) is discriminated as the pattern P6 (B1, B2). And the actual pattern P3 (A1, C2) is discriminated as the pattern P5 (B1, A2) since data A is read as data B, and data C is read as data A.

More specifically, when the data reproduced by ordinary tracking cannot be discriminated as the pattern P1 or P3 or when the accuracy of such discrimination is low, a playback operation is performed in both detrack states with deviations $+\alpha$ and $-\alpha$. And if the result of the $+\alpha$ detrack playback is the pattern P12 and the result of the $-\alpha$ detrack playback is the pattern P5, the data can be discriminated as the pattern P3. Similarly, if the result of the $+\alpha$ detrack playback is the pattern P11 and the result of the $-\alpha$ detrack playback is the pattern P6, the data can be discriminated as the pattern P1.

Thus, due to discrimination of the data by the data map of FIG. 10 with the $+\alpha$ detrack playback and the data map with the $-\alpha$ detrack playback, it becomes possible to improve the redundancy and to cancel any adverse influence derived from crosstalk or the like.

Application to the verification is rendered possible also by determining $\pm\alpha F$ defocus states in comparison with a proper focus state regarded as 0.

In a defocus state for example, there may occur a case where the modulation degree is lowered (with the level of pattern P10 changed from 6 to 5) or is raised (with the level of pattern P7 changed from 2 to 3) while the push-pull signal of patterns P1, P7, P16, P10 remains unchanged. In other words, a data map can be formed by $+\alpha F$ and $-\alpha F$ defocus states, which may be utilized similarly to the above.

In this embodiment, a scan for playback is executed as denoted by R1, R2 ... and so forth in FIG. 3A, whereby each track is scanned twice for playback.

Therefore, in case any adverse influence is derived from crosstalk, the operation for verification can be performed with reference to the data obtained by the preceding scan.

With regard to the track #2 in FIG. 3 for example, 4-value data reproduced from the track #2 by a scan R1 is stored temporarily in the 16-value converter 31c. And in response to input of next 4-value data reproduced from the track #2 by a following scan R2, such input data is compared with the stored data obtained by the preceding scan R1. And after verifying a coincidence therebetween, the reproduced data of the track #2 is more accurately determined.

Similarly the reproduced data of the track #3 is decided on the basis of the data obtained from the track #3 by a scan R2 and the data obtained therefrom by a following scan R3. After verifying proper extraction of the stored data in this manner, the 16-value data is reproduced according to the data map. Such verification is effective to diminish or eliminate any data reproduction error.

Besides the above procedure, verification may also be performed with addition of the reproduced data obtained by the aforementioned $\pm\alpha$ detrack scans. Regarding the track #2 for example, any harmful influence of the crosstalk from the adjacent track #3 can be reduced by executing a scan R1 in a $+\alpha$ detrack state (using the $+\alpha$ detrack data maps). Similarly, any harmful influence of the crosstalk from the adjacent track #1 can be reduced by executing a scan R2 in a $-\alpha$ detrack state (using the $-\alpha$ detrack data map).

Since proper data reproduction with such verification is achievable by canceling the crosstalk, it becomes possible to set the track pitch to a value smaller. If there exists a margin in the disc rotation rate and a twice-read is possible inclusive of additional detrack-state tracking, a even higher density is realizable in the recording.

The embodiment described hereinabove is concerned with an exemplary case of setting deviations $\pm\alpha$ relative to wobble pits. In case the signal-to-noise ratio is sufficiently high, other wobble pits having deviations $\pm\beta$ and $\pm\gamma$ may also be provided in addition to the wobble pits having the deviations $\pm\alpha$.

In such modified embodiment, the data represented on the track comprises, for example, 8 values including a non-wobble pit (said data A), $\pm\alpha$ wobble pits (said data B, C), a mirror portion M, $\pm\beta$ wobble pits (data D, E) and $\pm\gamma$ wobble pits (the said data F, G).

Therefore a total of 64-pattern data are recorded on a pair of adjacent tracks, so that 64-value data can be reproduced at a timing of one bit. In this case, if the pit length is set to 0.8 μm, it becomes possible to realize a high density corresponding substantially to 0.0125 μm/bit (32 times the density on the known compact disc).

Although patterns are represented on each pair of tracks in the embodiment mentioned, there may be contrived a modification where the track pitch and the spot size are so set as to irradiate the beam spot onto three or more tracks simultaneously under the condition that the record data is generated on each track by a logic calculation of the input data and the record data on the preceding two or more tracks.

Relative to the scan for playback, the aforementioned procedure of scanning the intermediate position between the adjacent tracks as R1, R2, R3, ... and so forth in FIG. 3 may be so modified as to scan each track merely once as R1, R3, ... and so forth.

In this embodiment, data are recorded in the shape of embossed pits. However, it is to be understood that the present invention is applicable also to another type where data are represented by grooves. In this case, three or more values are represented by the use of wobbling grooves having deviations of $\pm\alpha$ and so forth from an on-track groove.

Furthermore the recording medium is not limited merely to an optical disc alone, and the present invention is applicable to card-like recording media as well.

What is claimed is:

1. An optical recording medium where tracks are formed on a recording surface, each track being centered respectively about a track center, at such a track pitch that at least two tracks are scanned simultaneously by a spot of a light beam irradiated onto the recording surface, each track having wobble pits formed at positions deviated from the track center, a multiplicity of pits formed exactly on the track center, and a first mirror portion with no pits formed between the wobble pits and the multiple pits which are disposed successively; wherein signal-processed data are recorded on each track in such a manner that the data can be detected therefrom on the basis of a push-pull signal and a sum signal obtained by scanning a preceding track and a following adjacent track with the light beam irradiated onto the recording surface.

2. The optical recording medium according to claim 1, comprising reference pattern data composed of the wobble pits and the pits positioned exactly on the track.

3. The optical recording medium according to claim 2, wherein the reference pattern data is partially a servo pattern for obtaining a tracking error signal.

4. An optical recording medium for being reproduced by a laser beam spot of an optical reproducing device, the optical recording medium comprising:

a recording surface;

a first track recorded on the recording surface about a track center, with first centered pits located at the first track center and first offset pits at locations offset from the first track center; and a second track, which is adjacent to the first track, recorded on the recording surface about a second track center, with second centered pits located at the second track center and second offset pits at locations offset from the second track center;

wherein the first centered pits, the first offset pits, the second centered pits and the second offset pits are located so they can be simultaneously scanned by the laser beam spot.

* * * * *